United States Patent
Vetsch

(10) Patent No.: US 8,060,296 B2
(45) Date of Patent: Nov. 15, 2011

(54) LOW COST AIRCRAFT CENTER OF GRAVITY MONITORING SYSTEMS AND METHODS

(75) Inventor: LeRoy E. Vetsch, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 467 days.

(21) Appl. No.: 12/269,723

(22) Filed: Nov. 12, 2008

(65) Prior Publication Data

US 2010/0121560 A1    May 13, 2010

(51) Int. Cl.
    G08B 21/00    (2006.01)
    G06F 3/048    (2006.01)
    G06F 17/00    (2006.01)

(52) U.S. Cl. .............. 701/124; 701/3; 701/9; 340/967; 73/802

(58) Field of Classification Search .......... 701/124, 701/9, 10, 3; 340/967; 715/771; 73/802, 73/808
    See application file for complete search history.

(56) References Cited

U.S. PATENT DOCUMENTS

| | | | |
|---|---|---|---|
| 3,581,836 A | 6/1971 | Segerdahl et al. | |
| 3,701,279 A * | 10/1972 | Harris et al. | 73/65.06 |
| 3,802,523 A | 4/1974 | Clark | |
| 4,110,605 A * | 8/1978 | Miller | 701/124 |
| 4,463,428 A | 7/1984 | Gilliam | |
| 5,548,517 A | 8/1996 | Nance | |
| 6,128,951 A * | 10/2000 | Nance | 73/178 T |
| 6,353,793 B1 * | 3/2002 | Godwin et al. | 701/124 |
| 6,415,242 B1 | 7/2002 | Weldon et al. | |
| 6,650,974 B2 * | 11/2003 | Chamas et al. | 701/5 |
| 7,281,418 B2 | 10/2007 | Mardirossian | |
| 2008/0119967 A1 * | 5/2008 | Long et al. | 701/3 |
| 2009/0125169 A1 * | 5/2009 | Edwards et al. | 701/16 |

* cited by examiner

*Primary Examiner* — Tan Q Nguyen
(74) *Attorney, Agent, or Firm* — Fogg & Powers LLC

(57) ABSTRACT

Systems and methods for determining center of gravity for an aircraft. An example system includes one or more load measurement devices that generate one of nose gear or main gear weight information and a processing device that determines center of gravity of the aircraft based on previously received gross weight information and the generated nose or main gear weight information. The number of gear sets with load measurement devices is one less that the total number of gear sets having distinct longitudinal positions along a fuselage of the aircraft. The processing device further determines center of gravity based on temperature and/or pitch attitude information. The system includes a user interface that allows a user to enter the gross weight information that might be included in a flight manifest or a load and trim sheet and/or a communication component that receives the gross weight information from a ground-based system.

23 Claims, 2 Drawing Sheets

LOW COST AIRCRAFT CENTER OF GRAVITY MONITORING SYSTEMS AND METHODS

BACKGROUND OF THE INVENTION

Modern aircraft are equipped with a generous assortment of sensors and instrumentation to facilitate operation of the aircraft. Nearly every parameter critical to safe and efficient operation is accurately monitored in real time, with one notable exception. The gross weight and longitudinal center of gravity, both critical to safe and efficient operation, are based on a variety of inputs, which include a mixture of predetermined "known" values, measured values, and estimates based on statistical sampling. The Load and Trim Sheet, or Manifest, is the outcome of the load planning process that utilizes these inputs. Although the load planning process is highly controlled, there are opportunities for undetected errors. In addition, even if the load plan is perfect, the actual loading process can introduce errors that cannot be detected without a real-time measurement of the "as loaded condition" of the aircraft. And, during the loading process the aft section can become disproportionately heavy (due to early aft loading of cargo and/or baggage) resulting in the aircraft tipping (tail down), which can cause damage to the fuselage.

According to the National Aerospace Laboratory Report Number NLR-TP-2007-153, the majority (more than 90%) of weight and balance problems identified could be eliminated if there was a system available to the flight crew that would do an automatic onboard weight and balance assessment.

Present on-board aircraft weight and balance systems (WBS) require a multitude of precision sensors (usually one or more per wheel location) historically resulting in a system that is too expensive to be practical for smaller, lower cost aircraft. Therefore, only the very high value large wide body aircraft currently utilize these systems.

An analysis of aircraft loading parameters and in-service data has shown that the most critical, and also the most challenging, loading parameter is the loading of the aircraft within the center of gravity limits. The operator can usually determine the gross weight of the aircraft within an acceptable degree of accuracy, and aircraft performance is reasonably tolerant of minor gross weight uncertainty—as long as the center of gravity is within limits. However, if the center of gravity is outside of the acceptable envelop, by even a few inches, the aircraft can become uncontrollable and unsafe. Therefore, a lower cost solution need not focus on highly accurate gross weight determination, but must instead be optimized for an accurate real time measurement of the actual center of gravity.

SUMMARY OF THE INVENTION

The present invention provides systems and methods for determining center of gravity for an aircraft. An example system includes one or more load measurement devices that generate one of nose gear or main gear weight information and a processing device in data communication with the one or more load measurement devices that determines center of gravity of the aircraft based on previously received gross weight information and the generated nose or main gear weight information.

In one aspect of the invention, the number of gear sets with load measurement devices is one less than the total number of gear sets having distinct longitudinal positions along a fuselage of the aircraft.

In another aspect of the invention, the gear set with load measurement devices is the nose gear, and the nose gear load data (with or without the gross weight data and/or the aircraft pitch data) is used to determine an impending tail tip condition that can be used to annunciated an impending tip condition marginally before an actual tip would occur.

In another aspect of the invention, the processing device further determines center of gravity based on temperature and/or pitch attitude information.

In still another aspect of the invention, the system includes a user interface that allows a user to enter the gross weight information that might be included in a flight manifest or a load and trim sheet.

In yet another aspect of the invention, the system includes a communication component that receives the gross weight information from a ground-based system.

In still yet another aspect of the invention, the system includes a communication component that receives the gross weight information from another aircraft on-board system that, either received the gross weight information from one of the previously described methods, or derived the gross weight information based on inputs from one or more of the previously described methods.

BRIEF DESCRIPTION OF THE DRAWINGS

Preferred and alternative embodiments of the present invention are described in detail below with reference to the following drawings.

DETAILED DESCRIPTION OF THE INVENTION

The present invention provides a low cost aircraft weight and balance system (WBS) that accurately and automatically determines center of gravity (CG) for an aircraft.

The present invention focuses system performance on only those measurements absolutely required for determination of the actual "as loaded" center of gravity (CG) and obtains other information required for the (CG) calculation from other existing data sources (such as the Load and Trim Sheet or Flight Manifest). In one embodiment, only gross weight (GW) data from a flight manifest and measured nose gear weight are used to calculate the CG. For this embodiment the measured nose gear weight (either with or without the gross weight data and/or the aircraft pitch attitude data) is used to determine and annunciate when the aircraft is approaching a tail tip condition (too much weight too far aft). In another embodiment, an aircraft pitch measurement is used to further improve the accuracy of the calculated CG. This method provides an unexpected result of CG information better than +/−3% Mean Aerodynamic Chord (MAC) using the gear location moment arms, and the MAC length and location values stored in system memory, (optionally with the fuselage pitch angle from another on-board system, or a sensor within the CG monitoring system). Gross weight data (estimates) from the flight manifest (or Load and Trim Sheet) need only be within about +/−5% of actual. Industry surveys indicate that an operator can usually estimate the aircraft weight within 2 to 3%, but are much less accurate when determining CG. This is because, with few exceptions the operator knows what goes on the aircraft, but it is more difficult to ensure that it went to the proper (as planned) location. Furthermore, small errors in what does or does not go on the aircraft do not produce large errors in the total gross weight and do not usually result in unsafe conditions that would be "catastrophic" to aircraft performance. On the other hand, small errors in the load distribution within the aircraft can easily result in a center of gravity condition that is out of range and unsafe.

Figure 1:
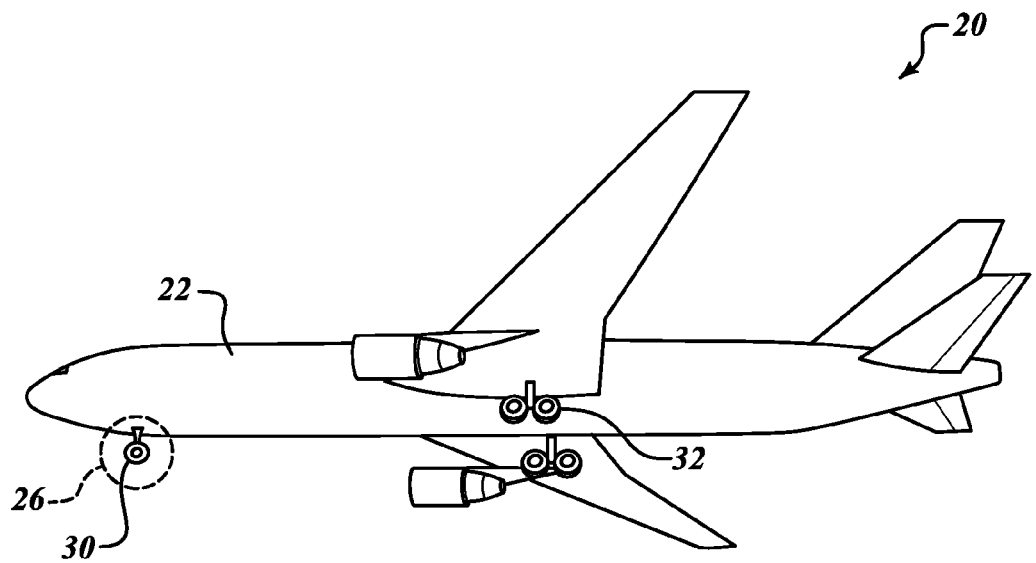
FIG. 1 is a perspective view of an aircraft having a weight balance system formed in accordance with an embodiment of the (WBS) present invention.
Figure 2:
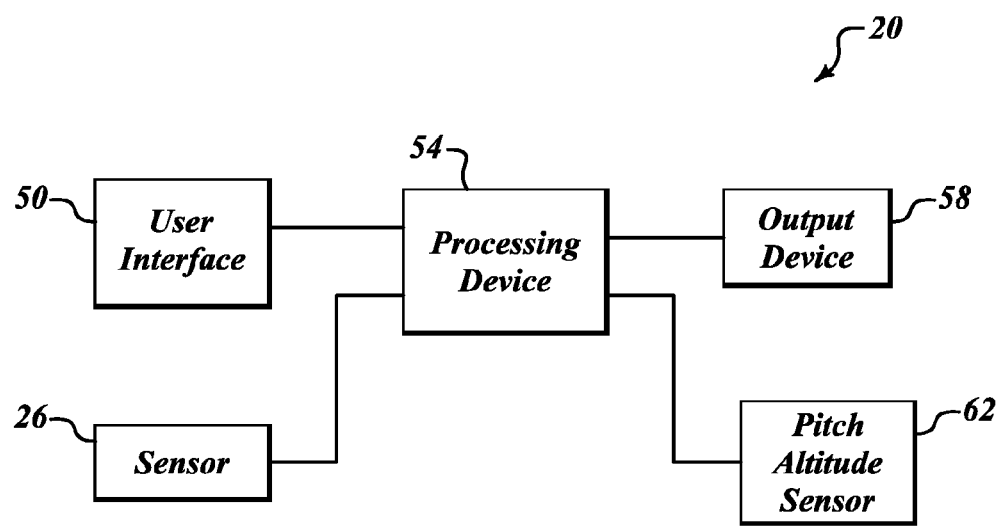
FIG. 2 is a block diagram of an example WBS used in the aircraft in FIG. 1.

As shown in FIGS. 1 and 2, an example WBS system 20 on an aircraft 22 includes load measurement sensor(s) 26 on nose gear 30 (or main gear 32, but not both), a user interface 50, memory 52, an output device 58, a communication device 60 and optionally a pitch attitude sensor 62 and temperature sensor 66, all of which are in signal communication with a processing device 54. The load measurement sensor(s) 26 could be a strain measurement sensor such as that shown in U.S. Pat. No. 4,269,070 (herein incorporated by reference), strut pressure measurement sensors, or any other sensing device that results in an accurate measurement of the "as loaded" weight on the aircraft nose gear 30.

Figure 3:
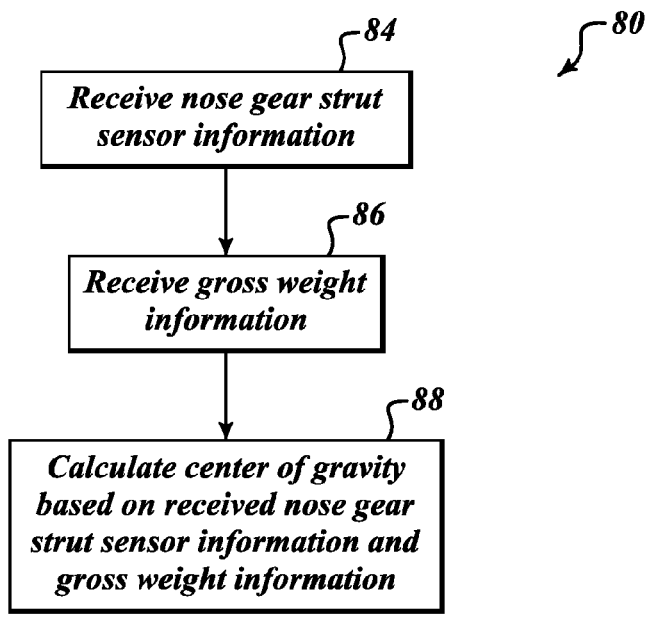
FIG. 3 is a flow diagram showing an example process executed by the WBS shown in FIGS. 1 and 2.

The system 20 receives an input of the aircraft gross weight from the load manifest or other means via the user interface device 50 (e.g. keyboard, key pad, etc.) or via the communication device 60 (wireless data link to a ground control system or other system having the gross weight information). From these two inputs (26, 50), and a pre-defined moment arm table stored in memory 52 for the specific aircraft model, the processing device 54 calculates the CG by moment summing (FIG. 3, blocks 84-88), and optionally corrects the CG location for aircraft pitch. The pre-defined moment arm table includes relative moment arm locations for all longitudinal gear location, and the MAC, and the length of MAC. For pitch correction versions, the memory 52 includes information regarding the CG location correction per degree of pitch—which can also be related to the gross weight.

The processing device 54 uses the moment summing equation to determine the location of the aircraft CG, based on the nose gear 30 load (nose weight reacted at the ground), which is:

$$CG(\text{location}) = \text{Sum of the Moments/Sum of the Weights}.$$

Nose Gear Weight=NWt (measured)
Total Weight or Gross Weight=GW (from the manifest)

$$\text{Main Gear } Wt \text{ or } MWt = GW - NWt$$

Nose Gear Moment Arm=NA (defined by aircraft physical characteristics)
Main Gear Moment Arm=MA (defined by aircraft physical characteristics)
and $$CG(\text{location}) = [(NWt*NA) + (MWt*MA)]/GW \text{ or } CG(\text{location}) = [(NWt*NA) + (GW - NWt)*MA]/GW.$$

The above equations are the general forms and are valid for determining the CG(location) from any reference location. The resultant location is a distance from the "0" reference point used to describe the nose and main gear arms. To covert the CG location to % MAC units the location must be converted to a distance along the mean aerodynamic chord, and then divided by the length of MAC to arrive at a % MAC value. If the leading edge of MAC (LEMAC) is used as the "0" reference point for the gear moment summing ("0" arm), the resulting location will be a distance along the MAC and can simply be divided by the MAC length to obtain % MAC units.

$$CG \text{ (in \% of MAC units)} = 100*[(NWt*NA) + (MWt*MA)/(GW)]/MAC,$$

NA is a negative number,
MA is a positive number.

So, for a three strut aircraft, where the two main gear struts are located at the same longitudinal moment arm, the CG location can be determined from the GW by measuring only the Nose Gear weight, and using other fixed physical characteristics of the aircraft. Other fixed physical characteristics include the moment arms to the gear and MAC locations, the length of MAC, and the pitch correction coefficients (location correction versus degrees of pitch, which may sometime vary with gear weight or gross weight.

For an aircraft with additional load carrying main gear (not shown), located at different moment arms (different longitudinal position from the main gear 32), additional load measurements may be required to achieve the desired accuracy. That is, due to unequal load distribution between the various main gear moment arms, the "average main gear moment", in combination with the "measured nose gear moment" would result in a CG location calculation with greater uncertainty, and, therefore, potentially less accurate than the previously described configuration. This may be suitable for some applications. In one embodiment, additional measurements are included for one less than the total number of distinct moment arms. Therefore, by using the gross weight data from an alternate source (such as the manifest), the CG has reasonable accuracy by measuring the reacted loads at n-1 of the longitudinal moment arm locations. The math for multi-gear versions would be the same, except the moment summing equation will have additional terms for each longitudinal gear location arm. Also, as stated above, although any combination of n-1 gear measurements can be used for the CG calculation, some combinations will result in a more accurate CG indication. The determination to use main gear measurements and omit the nose gear measurement, or use the nose gear measurement with one or more main gear measurements (omitting a main gear measurement) will depend on the load distribution profile for the specific application.

In another embodiment, the gear set with load measurement devices is the nose gear, and the nose gear load data (with or without the gross weight data and/or the aircraft pitch data) is used to determine an impending tail tip condition. If an impending tail tip condition has been determined, an impending tip condition annunciation is outputted before an actual tip would occur.

The following provides an example of the expected CG calculation and accuracy based on a typical small aircraft profile. For this example it is assumed that 10% of the total GW is on the nose gear, the MAC=170, the pitch angle is "0", and the moment arms are as noted (summing about the LEMAC);

$$CG \text{ (\% MAC)} = 100*\{[(NWt*NA) + (MWt*MA)]/(GW)\}/MAC$$

$$CG \text{ (\% MAC)} = 100*\{[(0.10*-400) + (0.90*100)]/1.00\}/170$$

$$CG \text{ (\% MAC)} = 100*\{[(-40) + (90)]\}/170 = 50/170 = 29.4\% \text{ MAC}$$

And the equivalent calculation, summing about the main gear location;

$$CG\ (\%\ MAC) = 100 * \{[(NWt*NA)+(MWt*MA)]/(GW)\}/MAC$$

$$CG\ (\%\ MAC) = 100 * \{[(0.10*-500)+(0.90*0)]/1.00\}/170$$

$$CG\ (\%\ MAC) = 100 * \{[(-50)]/1.0\}/170 = 50/170 = 29.4\%\ MAC$$

Figure 4:
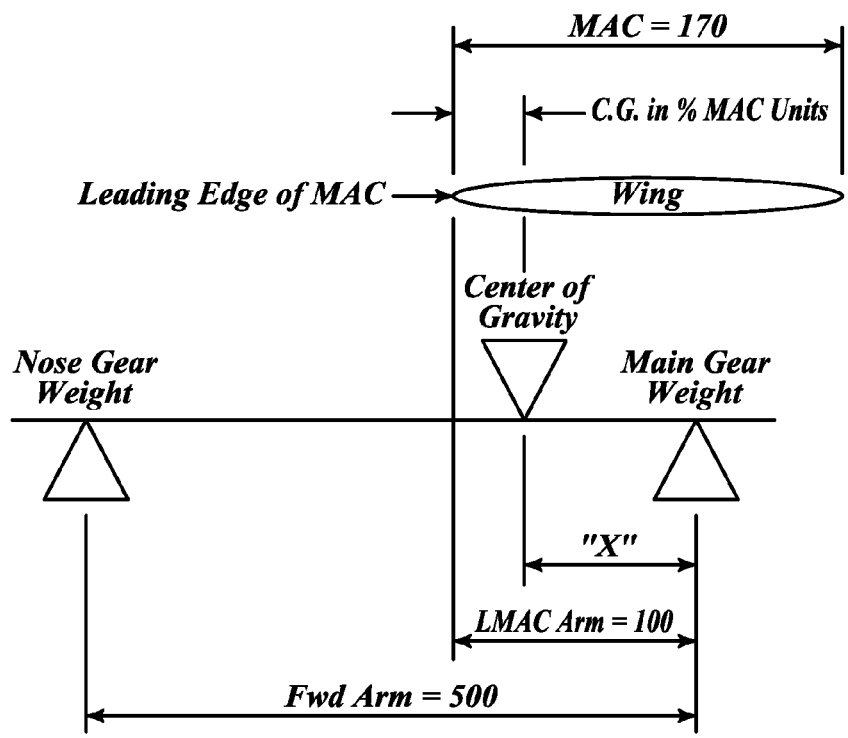
FIG. 4 illustrates geometric relationships of sensed weight and center of gravity.

FIG. 4 illustrates how the GW & Nose weight accuracy will affect the calculated CG accuracy for the sample aircraft.

Because moment summing was done about the main gear location, any error in the nose gear weight measurement, or the GW estimate, will result in a corresponding error in the "X" distance calculation, with an equal and opposite sign error in the CG distance from the LEMAC. By dividing the "X" distance error by the MAC length (and multiplying by 100), and reversing the sign, the error can be expressed as a % MAC unit error.

Let "X" = the CG location from the main gear;

then, $"X" = (500 * Nose\ Wt+/-Err)/(GW+/-Err)$

Note that a 1% error in either the Nose Wt, or the GW will cause a 1% error in the resultant "X" value (+1% Nose Wt=+1% "X", and +1% GW=−1% "X"). Also note that when the Nose Wt and GW Errors are in the same direction they cancel (if they are also the same % magnitude). And finally, for a given percent weight error the result CG error is a percent of "X", and therefore the magnitude of the error will change as a function of "X" (the largest effect will be when "X" is the largest value—i.e., at the most forward CG location). This is significant because it also means that errors in the measured and estimated weight values will have the smallest impact on the indicated CG value when the CG is aft (the CG region where accuracy is the most important).

For the sample aircraft, with the CG at the fwd limit (25% MAC), the "X" distance is 57.5 inches and for Nose Wt error=+3% & GW error=−3% (opposite sign);

$"X"\ Err=57.5*(1-((1.0+0.03)/(1.0-0.03)))=+3.557$ Inches $CG\ Err=-3.557/170=-2.1\%\ MAC$ And for the same aircraft, with the CG at the aft limit (45% MAC), the "X" distance is 23.5 inches and for Nose Wt error=+3% & GW error=−3% (opposite sign);

$"X"\ Err=23.5*(1-((1.0+0.03)/(1.0-0.03)))=+1.454$ Inches $CG\ Err=-1.454/170=-0.86\%\ MAC$ Aircraft gross weight and center of gravity data must be provided to and accepted by the flight crew prior to take-off. This is to insure that take-off will not commence with an unsafe loading condition. The information may also be used to set take-off trim and trust, either by manual entry or through the flight control/management systems.

For additional accuracy improvement the CG can be corrected for aircraft pitch utilizing the pitch attitude sensor 62 or fuselage pitch angle data from other aircraft systems (not shown).

It is also possible to determine the aircraft CG by measuring only main gear load data using this technique. However, nose gear load measurement data generally requires fewer sensors and results in better CG accuracy. Also, for some applications, gear weight values may be temperature compensated to remove variations associated with changes in temperature based on information the processing device 54 receives from the temperature sensor 66.

While the preferred embodiment of the invention has been illustrated and described, as noted above, many changes can be made without departing from the spirit and scope of the invention. For example, CG can be determined using a combination of all the data available as described above (pitch attitude, temperature) and other data (e.g., humidity) not mentioned. Also, another embodiment includes another onboard system that calculates gross weight (presumably from other inputs, i.e., passenger count, fuel measurements, etc). Accordingly, the scope of the invention is not limited by the disclosure of the preferred embodiment. Instead, the invention should be determined entirely by reference to the claims that follow.

The embodiment of the invention in which an exclusive property or privilege is claimed are defined as follows:

1. A method for determining a center of gravity for an aircraft, the method comprising:
 receiving gross weight information for the aircraft;
 receiving gear load measurement information for a select group of fewer than all landing gear sets of the aircraft, the gear load measurement information corresponding to a load on the select group of fewer than all landing gear sets, wherein the gear load measurement information is generated by at least one load measurement sensor integrated into the select group of fewer than all landing gear sets; and
 automatically determining the center of gravity for the aircraft based on the received gross weight information and the gear load measurement information.

2. The method of claim 1, wherein receiving the gear load measurement information comprises receiving gear load measurement information from one less than a total number of gear sets of the aircraft having distinct longitudinal positions along a fuselage of the aircraft.

3. The method of claim 1, wherein automatically determining the center of gravity is further based on temperature.

4. The method of claim 1, wherein automatically determining the center of gravity is further based on pitch attitude information.

5. The method of claim 1, wherein receiving gross weight information for the aircraft comprises receiving the gross weight information from a user interface based on one of a flight manifest or a load and trim sheet.

6. The method of claim 1, wherein receiving gross weight information for the aircraft comprises receiving the gross weight information from a ground-based system via a communication link.

7. The method of claim 1, wherein receiving gross weight information for the aircraft comprises receiving portions of the gross weight information which when combined with other portions of the gross weight information are used to determine the aircraft gross weight.

8. The method of claim 1, further comprising providing an aircraft impending tail tip alarm signal based on the received gear load measurement information for the subset of landing gear sets.

9. The method of claim 1, wherein the at least one load measurement sensor includes at least one of a strain measurement sensor and a strut pressure measurement sensor.

10. A system for determining a center of gravity for an aircraft, the system comprising:
 one or more load measurement devices integrated into a select group of fewer than all landing gear sets of the aircraft, the one or more load measurement devices configured to generate gear load measurement information representing a load on the select group of fewer than all landing gear sets; and a processing device in data communication with the one or more load measurement devices, the processing device configured to determine the center of gravity of the aircraft based on previously received gross weight information and the generated gear load measurement information.

11. The system of claim 10, wherein the number of gear sets in the select group of fewer than all landing gear sets of the aircraft with load measurement devices is one less than the total number of gear sets having distinct longitudinal positions along a fuselage of the aircraft.

12. The system of claim 10, wherein the processing device further determines the center of gravity based on temperature.

13. The system of claim 10, wherein the processing device further determines the center of gravity based on pitch attitude information.

14. The system of claim 10, further comprising a user interface configured to allow a user to enter the gross weight information, wherein the gross weight information is based on one of a flight manifest or a load and trim sheet.

15. The system of claim 10, further comprising a communication component configured to receive the gross weight information from a ground-based system.

16. The system of claim 10, wherein the one or more load measurement devices includes at least one of a strain measurement sensor and a strut pressure measurement sensor.

17. A system for determining a center of gravity for an aircraft, the system comprising:
means for receiving gross weight information for the aircraft;
means for receiving gear load measurement information for a select group of fewer than all landing gear sets of the aircraft from one or more load measurement devices integrated into the select group of fewer than all landing gear sets; and
means for automatically determining the center of gravity of the aircraft based on the received gross weight information and the gear load measurement information.

18. The system of claim 17, wherein the means for receiving gear load measurement information receives gear load information from one less than the total number of gear sets of the aircraft having distinct longitudinal positions along a fuselage of the aircraft.

19. The system of claim 17, wherein the means for automatically determining the center of gravity further determines the center of gravity based on temperature.

20. The system of claim 17, wherein the means for automatically determining the center of gravity further determines the center of gravity based on pitch attitude information.

21. The system of claim 17, wherein the means for receiving gross weight information for the aircraft receives the gross weight information from a user interface based on one of a flight manifest or a load and trim sheet.

22. The system of claim 17, wherein the means for receiving gross weight information for the aircraft receives the gross weight information from a ground-based system via a communication link.

23. The system of claim 17, wherein the one or more load measurement devices includes at least one of a strain measurement sensor and a strut pressure measurement sensor.

* * * * *